United States Patent
Maruyama et al.

(10) Patent No.: US 11,929,094 B1
(45) Date of Patent: Mar. 12, 2024

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventors: Syosuke Maruyama, Yamato Kanagawa (JP); Hideo Shimokawa, Ome Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/115,396

(22) Filed: Feb. 28, 2023

(30) Foreign Application Priority Data

Sep. 22, 2022 (JP) ................................. 2022-150917

(51) Int. Cl.
*G11B 20/18* (2006.01)
*G11B 5/596* (2006.01)

(52) U.S. Cl.
CPC .......... *G11B 20/1879* (2013.01); *G11B 5/596* (2013.01); *G11B 20/1816* (2013.01); *G11B 2020/183* (2013.01)

(58) Field of Classification Search
None
See application file for complete search history.

(56) References Cited

U.S. PATENT DOCUMENTS

| 5,812,335 | A | * | 9/1998 | Kool ..................... G11B 5/596 |
| 6,662,338 | B1 | * | 12/2003 | Rezzi .................... G11B 20/18 |
| | | | | 713/400 |
| 7,925,959 | B2 | * | 4/2011 | Tan .................... G11B 20/1833 |
| | | | | 714/800 |
| 9,229,813 | B2 | | 1/2016 | Chatradhi et al. |
| 9,837,115 | B1 | | 12/2017 | Sridhara et al. |
| 10,140,180 | B1 | * | 11/2018 | Sridhara ............... H03M 13/29 |
| 10,275,309 | B2 | | 4/2019 | Yamamoto |
| 2008/0186616 | A1 | * | 8/2008 | Matsuura .............. G11B 20/10 |
| | | | | 360/77.02 |
| 2009/0199073 | A1 | * | 8/2009 | Kanaoka ........... G11B 20/1833 |
| | | | | 714/E11.032 |
| 2010/0023847 | A1 | * | 1/2010 | Morita ............... G11B 20/1879 |
| | | | | 714/801 |
| 2020/0210277 | A1 | * | 7/2020 | Ravindran ......... G11B 20/1833 |
| 2021/0225405 | A1 | * | 7/2021 | Coutinho ............ G06F 11/3034 |

* cited by examiner

*Primary Examiner* — Peter Vincent Agustin
(74) *Attorney, Agent, or Firm* — Allen & Overy LLP

(57) ABSTRACT

According to an embodiment, a track includes first sectors and a second sector. When write of a second data segment to a third sector that is one of the first sectors is requested from a host, a controller acquires the second data segment from the host and stores the second data segment in the memory, and reads a data set including all first data segments and all first information pieces from the track and stores the data set in the memory. The controller acquires a second information piece of the third sector, and updates a first data segment and a first information piece read from the third sector in the data set in the memory with the second data segment and the second information piece. The controller calculates a second parity while the updated data set to the track, and writes the second parity to the second sector.

18 Claims, 12 Drawing Sheets

FIG.4

RAM (27)

| TRACK NUMBER | ATI COUNTER |
|---|---|
| 0 | 4 |
| 1 | 3 |
| ⋮ | ⋮ |
| N | 6 |

- GENERATION INFORMATION
- MULTI-PURPOSE CONTROL INFORMATION
(FIRST UNCORRECTABLE INFORMATION, SECOND UNCORRECTABLE INFORMATION, GENERATION MISMATCH INFORMATION)

MAGNETIC DISK DEVICE AND METHOD

CROSS-REFERENCE TO RELATED APPLICATIONS

This application is based upon and claims the benefit of priority from Japanese Patent Application No. 2022-150917, filed on Sep. 22, 2022; the entire contents of which are incorporated herein by reference.

FIELD

Embodiments described herein relate generally to a magnetic disk device and a method.

BACKGROUND

There is a magnetic disk device having a function of protecting data written to each track in units of tracks. The magnetic disk device generates an error correction code for each track, and performs protection in units of tracks on the basis of the error correction code.

BRIEF DESCRIPTION OF THE DRAWINGS

FIG. 4 is a schematic diagram illustrating an example of a data structure of ATI information of the embodiment;

FIG. 5 is a schematic diagram illustrating an example of sector attribute information of the embodiment;

DETAILED DESCRIPTION

According to the present embodiment, a magnetic disk device is connectable to a host. The magnetic disk device includes a magnetic disk, a magnetic head, a memory, and a controller. The magnetic disk is provided with a first track including a plurality of first sectors and a second sector. The magnetic head writes and reads data to and from a magnetic disk. When a first data segment is stored with a first information piece in each of the plurality of first sectors, a first parity is stored in the second sector, and write of a second data segment to a third sector that is one of the plurality of first sectors is requested from the host, the controller operates as follows. Note that the first information piece is attribute information of a first sector storing thereof out of the plurality of first sectors. The controller acquires the second data segment from the host and stores the second data segment in the memory. The controller reads a first data set that includes all first data segments and all first information pieces from the first track and stores the first data set in the memory. The controller acquires a second information piece that is attribute information of the third sector. The controller updates, in the memory, a third data segment and a third information piece that are a first data segment and a first information piece read from the third sector out of the first data set with the second data segment and the second information piece. The controller calculates a second parity on a basis of a second data set that is the first data set after update while writing the second data set to the first track. The controller writes the second parity in the second sector.

Hereinafter, a magnetic disk device and a method according to embodiments will be described in detail with reference to the accompanying drawings. Note that the present invention is not limited to the present embodiment.

Embodiment

Figure 1:
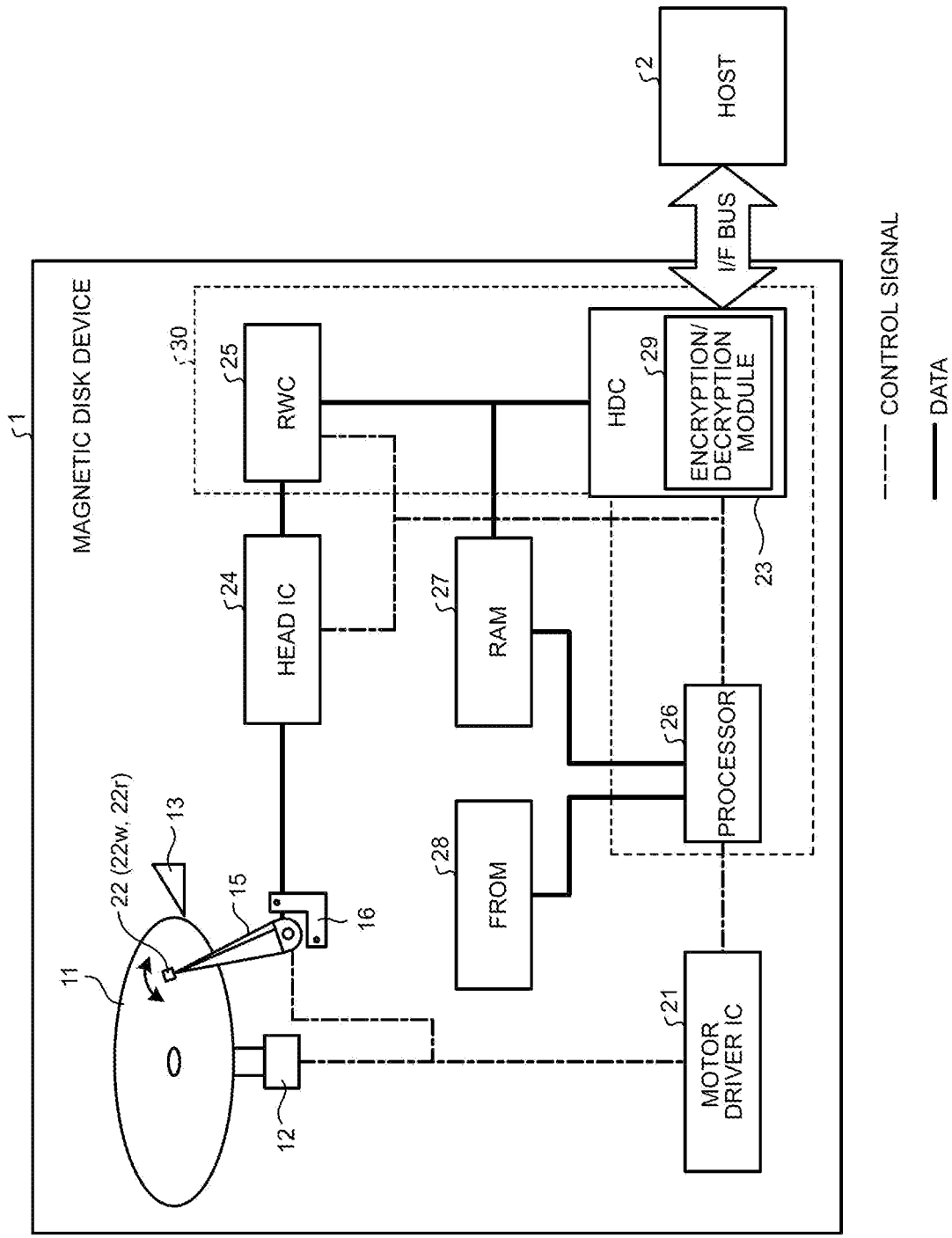
FIG. 1 is a schematic diagram illustrating an example of a configuration of a magnetic disk device of an embodiment.

FIG. 1 is a schematic diagram illustrating an example of a configuration of a magnetic disk device 1 of an embodiment.

The magnetic disk device 1 is connected to a host 2. The magnetic disk device 1 can receive an access command such as a write command or a read command from the host 2.

The magnetic disk device 1 includes a magnetic disk 11 having a magnetic layer formed on a surface thereof. The magnetic disk device 1 writes data to the magnetic disk 11 or reads data from the magnetic disk 11 in response to the access command.

The access command includes a logical address. The magnetic disk device 1 provides a logical address space to the host 2. The logical address indicates a position in the address space. The host 2 designates a position where data is written or a position where data is read by using the logical address. That is, the logical address is position information designated by the host 2. Note that the logical address is referred to as a logical block address (LBA).

Data is written and read via the magnetic head 22. In addition to the magnetic disk 11, the magnetic disk device 1 includes a spindle motor 12, a ramp 13, an actuator arm 15, a voice coil motor (VCM) 16, a motor driver integrated circuit (IC) 21, a magnetic head 22, a hard disk controller (HDC) 23, a head IC 24, a read/write channel (RWC) 25, a processor 26, a RAM 27, and a flash read only memory (FROM) 28.

The magnetic disk 11 is rotated at a predetermined rotation speed by a spindle motor 12 attached coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 by the write core 22w and the read core 22r provided therein. Further, the magnetic head 22 is attached to a distal end of the actuator arm 15. The magnetic head 22 is moved in a radial direction of the magnetic disk 11 by the VCM 16. Note that a plurality of one or both of the write core 22w and the read core 22r provided in the magnetic head 22 may be provided for the single magnetic head 22.

For example, when the rotation of the magnetic disk 11 is stopped, or the like, the magnetic head 22 is moved onto the ramp 13. The ramp 13 is configured to hold the magnetic head 22 at a position spaced apart from the magnetic disk 11.

The head IC 24 amplifies and outputs a signal read from the magnetic disk 11 by the magnetic head 22 during the read operation, and supplies the signal to the RWC 25. Further, the head IC 24 amplifies a signal corresponding to the data to be written supplied from the RWC 25 and supplies the amplified signal to the magnetic head 22 during a write operation.

The HDC 23 performs control of transmission and reception of data with the host 2 via an I/F bus, and the like.

The HDC 23 includes an encryption/decryption module 29. The HDC 23 encrypts data received from the host 2 using a key by the encryption/decryption module 29. The HDC 23 decrypts the data read from the magnetic disk 11 using the key by the encryption/decryption module 29.

The encryption/decryption module 29 manages keys used for encryption/decryption. Each key is associated with generation information. A key to be used can be changed by a command from the host 2, and the generation information is updated every time a key to be used is changed. The encryption/decryption module 29 manages each key to be used for encryption/decryption in association with LBA. That is, the magnetic disk device 1 is configured to be capable of using different keys for each position in the logical address space. Note that the magnetic disk device 1 may be configured such that one key is commonly used in all the logical address space.

The RAM 27 is used as a buffer for data to be written to the magnetic disk 11 and data read from the magnetic disk 11.

Further, the RAM 27 is used as an operation memory by the processor 26. The RAM 27 is used as an area in which firmware is loaded and an area in which various types of management data are temporarily stored.

The RAM 27 includes a volatile memory capable of high-speed operation. The kind of the memory constituting the RAM 27 is not limited to a specific kind. The RAM 27 can be configured by, for example, a dynamic random access memory (DRAM), a static random access memory (SRAM), or a combination thereof. Note that the RAM 27 may be configured by any non-volatile memory. In addition, the memory as a buffer of data and a working area used by the processor 26 may be configured by different RAMS.

Note that the RAM 27 is an example of a memory of the embodiment.

The RWC 25 performs modulation such as error correction coding on data to be written supplied from the HDC 23 in units of sectors, and supplies the modulated data to the head IC 24. Further, the RWC 25 performs demodulation including error correction in units of sectors on a signal read from the magnetic disk 11 and supplied from the head IC 24, and outputs a demodulated signal to the HDC 23 as digital data.

The processor 26 is, for example, a central processing unit (CPU). The RAM 27 and a flash read only memory (FROM) 28 are connected to the processor 26.

The FROM 28 is a nonvolatile memory. The FROM 28 stores firmware (program data), various operation parameters, and the like.

The processor 26 performs overall control of the magnetic disk device 1 according to the firmware stored in the FROM 28. For example, the processor 26 loads firmware from the FROM 28 or the magnetic disk 11 to the RAM 27, and executes control of the motor driver IC 21, the head IC 24, the RWC 25, the HDC 23, and the like according to the loaded firmware.

The configuration including the HDC 23, the RWC 25, and the processor 26 can also be regarded as the controller 30 that controls the operation of the magnetic disk device 1. In addition to these components, the controller 30 may include other components (for example, the RAM 27, the FROM 28, or the like).

In addition, the encryption/decryption module 29 is not necessarily provided in the HDC 23. The encryption/decryption module 29 may be provided outside the HDC 23 or outside the controller 30.

In addition, a firmware program may be stored in the magnetic disk 11. Further, some or all of the functions of the processor 26 may be implemented by a hardware circuit such as a field-programmable gate array (FPGA) or an application specific integrated circuit (ASIC).

Note that the number of the magnetic disks 11 included in the magnetic disk device 1 is not limited to one. Further, the magnetic disk device 1 may include the actuator arms 15 and the magnetic heads 22 in a number corresponding to the number of magnetic disks 11. In addition, in a case where the magnetic disk device 1 includes a plurality of magnetic heads 22, the plurality of magnetic heads 22 may be integrally moved, or the plurality of magnetic heads 22 may constitute a plurality of groups that are independently movable.

Figure 2:
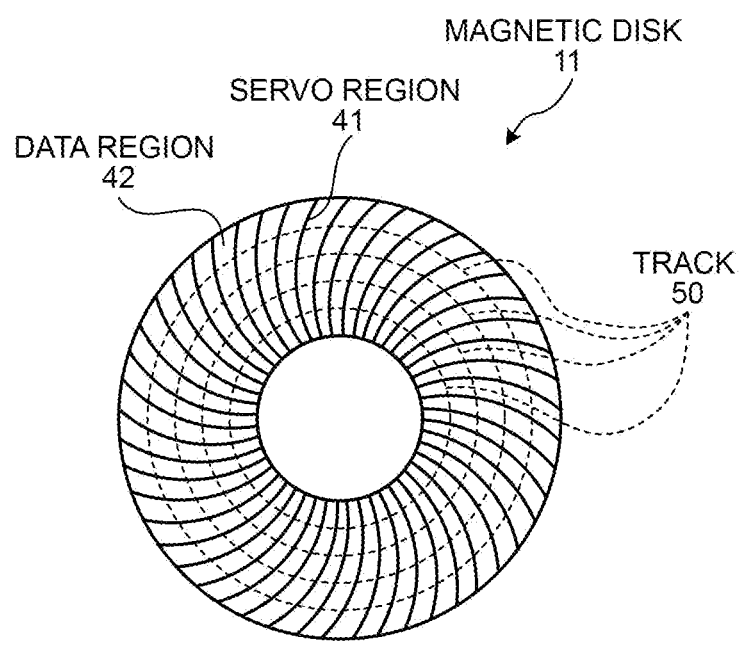
FIG. 2 is a diagram illustrating an example of a configuration of a magnetic disk of the embodiment.

FIG. 2 is a diagram illustrating an example of a configuration of the magnetic disk 11 of the embodiment. Servo data used for positioning the magnetic head 22 is written to a magnetic layer formed on the surface of the magnetic disk 11 by, for example, a servo writer or self-servo write (SSW).

FIG. 2 illustrates servo regions 41 radially arranged as an example of arrangement of the servo regions in which the servo data is written. In a circumferential direction, a space between the two servo regions 41 is a data region 42 where data can be written. A plurality of concentric tracks 50 is provided in the radial direction of the magnetic disk 11. A plurality of sectors in which data of a predetermined size is written is provided in the data region 42 on each track 50. The predetermined size is a sector size.

The servo data includes a servo mark, a gray code, a burst pattern, and a post code. The servo mark indicates the start of the servo data. The gray code includes an ID for identifying each track 50 provided in the magnetic disk 11, that is, a track number, and an ID for identifying each servo sector (that is, the servo region 41) on a track 50, that is, a servo sector number. The burst pattern is data used to detect the amount of positional deviation of the track 50 indicated by the track number included in the gray code from a track center. The track number included in the gray code is represented by, for example, an integer value, and it is possible to obtain, by demodulating the burst pattern, an offset amount below a decimal point based on the position indicated by the integer value. That is, the current position of the magnetic head 22 in the radial direction is obtained by demodulating the burst pattern. The post code is data for correcting a positional deviation from the shape of the track 50 defined by the gray code and the burst pattern from an ideal shape of the track 50.

When writing data to the magnetic disk 11 or reading data from the magnetic disk 11, the controller 30 executes positioning of the magnetic head 22, that is, seek control and tracking control on the basis of the servo data read from the servo region 41 by the magnetic head 22.

Figure 3:
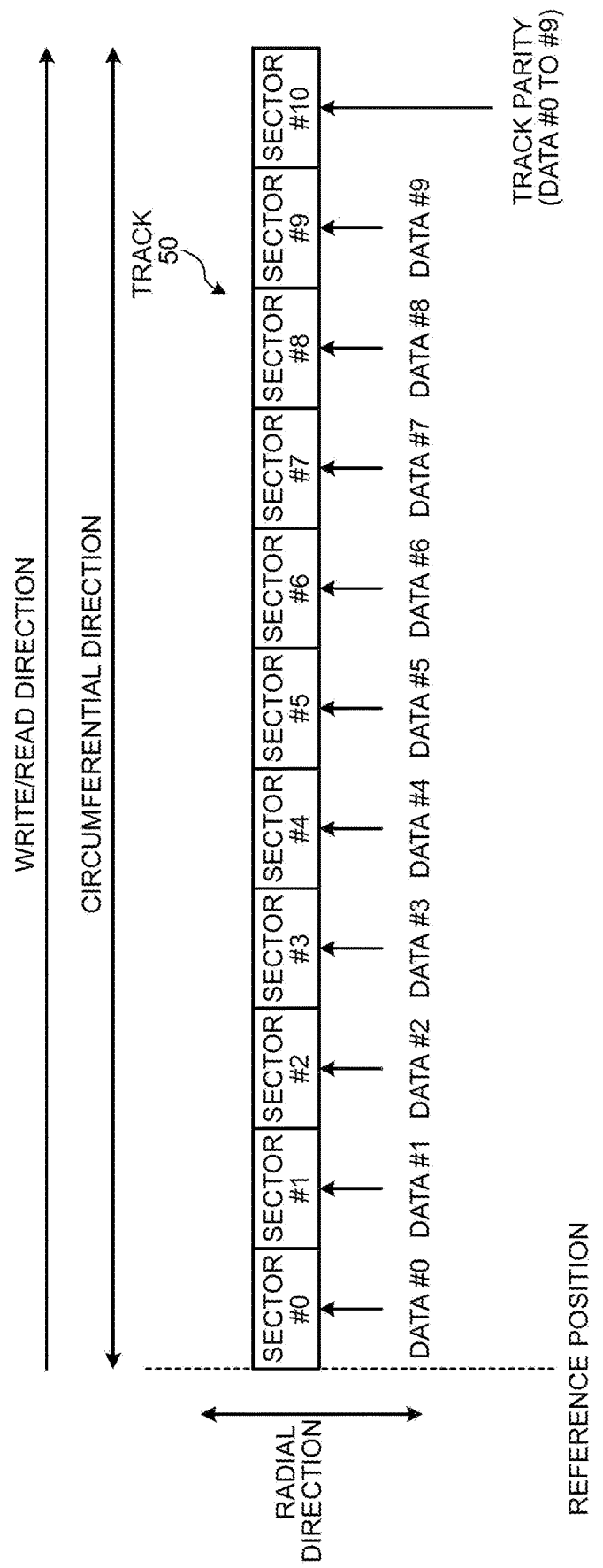
FIG. 3 is a schematic diagram illustrating an example of a configuration of one track of the embodiment.

FIG. 3 is a schematic diagram illustrating an example of a configuration of one track 50 of the embodiment. In the drawing, illustration of the servo region 41 is omitted. A write/read direction is illustrated in the drawing. The write/read direction is a direction in which the magnetic head 22 moves relative to the track 50 by the rotation of the magnetic disk 11. The magnetic head 22 writes or reads data in the write/read direction with respect to each track 50.

Each sector provided in the track 50 is identified by a sector number. A sector whose sector number is x is referred to as a sector #x. In the example illustrated in FIG. 3, the track 50 has 11 sectors from the sector #0 to the sector #10.

The data written to each sector includes an error correction code. The RWC 25 can perform error correction on data read from one sector in units of sectors using the error correction code included in the data.

The method of error correction coding for the error correction in units of sectors is not limited to a specific method. In one example, a low-density parity-check code is applied as the method of error correction coding for the error correction in units of sectors.

The 11 sectors are arranged in order of sector numbers in the write/read direction from a reference position in the circumferential direction. In this specification, a head and an end are defined based on the reference position and the write/read direction.

For example, regarding a section from when the magnetic head 22 passes through the reference position to when the magnetic head passes through the reference position next time, that is, the sector #0 to the sector #10, the sector through which the magnetic head 22 passes first, that is, the sector #0 is described as a head sector. With respect to the sector #0 to the sector #10, the sector through which the magnetic head 22 passes most recently, that is, the sector #10 is described as an end sector.

Further, the position where the magnetic head 22 on a sector starts passing is denoted as the head of the sector. The position on a sector where the magnetic head 22 finishes passing is denoted as an end of the sector.

The end sector #10 is a sector for storing the parity which is the error correction code. That is, the write in units of the track 50 is executed, for example, as follows. First, data is written to the sectors #0 to #9 in order of sector numbers. In the sector #10 at the end of the track 50, the parity calculated on the basis of the group of data written in the sectors #0 to #9 is written.

The parity written in the sector #10 protects a group of data written in the sectors #0 to #9 from the occurrence of an error. That is, the parity written in the sector #10 protects the data in units of tracks.

A method of calculating the parity is not limited to a specific method. In one example, the parity is generated by executing XOR for each bit position on data #0 to data #9.

Hereinafter, the error correction using the parity written in the end sector (sector #10 in the example of FIG. 3) is referred to as error correction in units of tracks. The parity written in the end sector is referred to as a track parity. A state in which the data written to the track 50 is protected by the track parity is referred to as a state in which a track protection function is effective. A state in which the data written to the track is not protected by the track parity is described as a state in which the track protection function is not effective.

Further, a sector in which data is stored, such as each of the sector #0 to the sector #9, is referred to as a data sector. Data written to a data sector #x may be referred to as data #x. The data #x may also be referred to as a data segment. A sector in which the parity is stored such as the sector #10 is referred to as a parity sector.

For example, in a case where data is written to all data sectors of a certain track 50 and a track parity calculated based on a group of data written to all data sectors is written to the parity sector of the track 50, the group of data written to the track 50 is corresponding to the track parity. Thus, the group of data written to the track 50 is in a state of being protected by the track parity. That is, the track protection function in the track 50 is effective.

When random write is performed on the track 50 in which the track protection function is effective, that is, data is overwritten on some sectors, the group of data in the track 50 becomes not to be corresponding to the track parity that has already been written, and is in a state of not being protected by the track parity. That is, the track protection function in the track 50 is not effective.

In the track 50 in which the track protection function is effective, when a new track parity is recalculated and the new track parity is overwritten to the parity sector, the group of data in the track 50 is protected by the new track parity. That is, the track protection function for the track 50 becomes to be effective.

Note that the state in which the track protection function is effective is an example of a first state. The state in which the track protection function is not effective is an example of a second state.

Adjacent track interference (ATI) is known as one of influences on adjacent tracks at the time of writing to a magnetic disk. For example, when data is written to one track 50 (referred to as a first track 50), a track 50 (second track 50) adjacent to the first track 50 is affected by ATI. The influence of ATI which the second track 50 received is accumulated according to the number of times of write to the first track 50. When the influence of ATI which the second track 50 received becomes too large, it becomes difficult to read data stored in the second track 50.

The controller 30 executes rewrite of data stored in a track 50 before it becomes difficult to read the data due to the influence of ATI.

The controller 30 estimates the degree of influence of the ATI which each track 50 received using, for example, ATI information 271.

FIG. 4 is a schematic diagram illustrating an example of a data structure of the ATI information 271 of the embodiment.

The ATI information 271 has a data structure of a table in which an ATI counter is recorded for each track 50. When writing data to a track 50, the controller 30 increments the ATI counter for a track 50 near the write destination track 50. The value to be added in one increment is determined by the designer and by any method. In one example, the closer to the write destination track the larger the value is incremented. That is, the ATI counter indicates an estimated value of the degree of influence of ATI to which the corresponding track 50 is subjected.

The controller 30 compares the ATI counter of each track 50 with a threshold value. Then, in a case where the ATI counter exceeding the threshold value is found, the controller 30 executes rewrite on the track 50 corresponding to the ATI counter. After the rewrite, the controller 30 resets the ATI counter of the rewritten track 50.

Hereinafter, track unit rewrite executed for a track 50 in which the ATI counter exceeds the threshold value is referred to as a rewrite operation.

In the embodiment, the controller 30 uses different values between when the track protection function is effective and when the track protection function is not effective as the threshold value to be compared with the ATI counter.

The track 50 in which the track protection function is not effective is vulnerable to the influence of ATI as compared with the track 50 in which the track protection function is effective. Thus, when the track protection function is not effective, the controller 30 uses a smaller value as the threshold value than when the track protection function is effective.

For example, after performing write on a certain track 50 (referred to as a third track 50) in units of tracks, the controller 30 uses a first threshold value for comparison with the ATI counter corresponding to the third track 50. Then, when overwriting is performed on some data sectors of the third track 50, the track protection function in the third track 50 becomes not to be effective. Then, the controller 30 uses a second threshold value smaller than the first threshold value for comparison with the ATI counter corresponding to the third track 50. Consequently, even if the protection by the parity becomes not to be effective, it is prevented that read of data stored in the third track 50 becomes difficult due to the influence of ATI.

That is, for the track 50 in which the track protection function is effective, the controller 30 does not execute the rewrite operation even if the ATI counter exceeds the second threshold value. When the ATI counter of the track 50 in which the track protection function is effective exceeds the first threshold value, the controller 30 executes the rewrite operation.

Here, a technology to be compared with the embodiment will be described. The technology to be compared with the embodiment is referred to as a comparative example.

It may be necessary to perform random write in response to a write command from the host on a track in which the ATI counter exceeds the second threshold value and the track protection function is effective. In the description of the embodiment for the comparative example and the comparative example, such a track is referred to as a target track. In the comparative example, in order to prevent the ATI counter from exceeding the second threshold value at the same time as the track protection function becomes not to be effective in the target track, the controller operates as follows. That is, before executing the random write according to the write command, the controller performs the rewrite operation on the target track and resets the ATI counter of the target track. Thereafter, the controller executes random write in accordance with the write command on the target track.

However, according to the above-described comparative example, since the random write is executed after the rewrite operation is executed, the number of times of necessary write is large, and the time required for processing the write command becomes long.

Furthermore, according to the comparative example, when the processing of the write command is completed, the track protection function of the target track becomes not to be effective. Thus, in order to keep the track protection function of the target track effective, the controller needs to recalculate and overwrite the track parity after the processing of the write command.

In the embodiment, in a case where the random write is performed on the target track, the controller 30 reads a set of data corresponding to one track from the target track as a part of the rewrite operation, and stores the set in the RAM 27. A set of data for one track is referred to as track data. The controller 30 updates the track data on the RAM 27 with data (hereinafter referred to as write data) requested to be written by the write command from the host 2. In other words, the write data is merged with the track data in the RAM 27. The controller 30 writes the track data after update to the target track as a part of the rewrite operation. At the time of writing the track data after update, the controller 30 executes recalculation and overwrite of the track parity.

That is, in a case where the random write is performed on the target track, the controller 30 starts the rewrite operation, and writes the write data at the same time when the track data is written to the magnetic disk 11 in the rewrite operation. Thus, according to the embodiment, since the number of times of write for the target track is suppressed as compared with the comparative example, the time required for processing of the write command is suppressed. That is, write performance is improved.

Further, according to the embodiment, when the processing of the write command is completed, the target track is in a state in which the track protection function is effective. Thus, unlike the comparative example, processing of recalculation and overwrite of the track parity after the processing of the write command can be omitted.

Note that the track data on the magnetic disk 11 includes attribute information for each sector. The attribute information is not included in the write data received from the host 2. Such attribute information included in the track data on the magnetic disk 11 and not included in the write data is referred to as sector attribute information. The sector attribute information 300 is written to each data sector. The sector attribute information 300 represents attributes relating to the data sector in which the sector attribute information is stored.

FIG. 5 is a schematic diagram illustrating an example of sector attribute information of the embodiment.

The sector attribute information 300 includes the generation information and multi-purpose control information.

The generation information is generation information of a key used by the encryption/decryption module 29 at the time of encryption before writing data written in the sector.

In the embodiment, at the time of reading data according to the read command, in a case where the generation information of the key used for decryption is different from the generation information of the key used for encryption before writing, the data is considered to be erased. That is, the controller 30 does not respond to the host 2 with the data. In order to enable comparison of the generation information, the controller 30 writes the generation information together with the data when writing the data to the magnetic disk 11.

The multi-purpose control information is attribute information used for various kinds of control. The multi-purpose control information includes, for example, first uncorrectable information, second uncorrectable information, and generation mismatch information.

The first uncorrectable information and the second uncorrectable information are information related to errors, and specifically, are information in which it is recorded that data is an uncorrectable. The uncorrectable means that an error included in data cannot be corrected by error correction.

The controller 30 can execute various kinds of error correction including error correction in units of sectors and error correction in units of tracks. In a case where the error cannot be corrected by any error correction, the controller 30 records a value indicating "uncorrectable" in the first uncorrectable information.

The second uncorrectable information is information in which a value meaning "uncorrectable" is recorded in response to a request from the host 2. For example, the write command includes flag information called an uncorrectable write. When receiving the write command in which the flag information of the uncorrectable write is turned on, the controller 30 writes data according to the write command and records a value indicating "uncorrectable" in the second uncorrectable information.

The generation mismatch information is information in which it is recorded that the generation information of the key used for decryption is different from the generation information of the key used for encryption before writing. At the time of reading data according to the read command, in a case where the generation information of the key used for decryption is different from the generation information of the key used for encryption before writing, the controller 30 records a value indicating "generation mismatch" in the generation mismatch information.

The controller 30 can use the multi-purpose control information described above for various kinds of control. In one example, in a case where the multi-purpose control information in which a value meaning "uncorrectable" is recorded in the first uncorrectable information or the second uncorrectable information is read at the time of reading data according to a read command from the host 2, the controller 30 refrains from responding to the host 2 with data. Further, in a case where the generation mismatch information in which the value indicating "generation mismatch" is recorded is read, the controller 30 refrains from responding to the host 2 with data.

When updating the track data with the write data, the controller 30 converts the format of the write data into a format including the sector attribute information 300, and then updates the track data with the write data after conversion.

Note that a specific example of the updating method including the method for converting the write data will be described later.

Next, an operation of the magnetic disk device 1 of the embodiment will be described.

Figure 6:
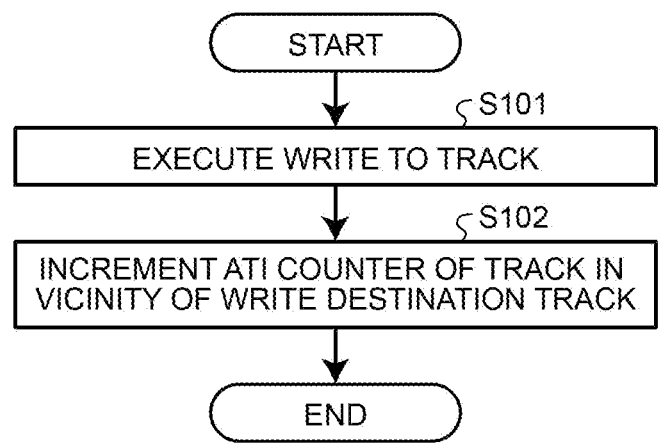
FIG. 6 is a flowchart illustrating an example of an operation of incrementing an ATI counter by a controller of the embodiment.

FIG. 6 is a flowchart illustrating an example of an operation of incrementing the ATI counter by the controller 30 of the embodiment.

When writing data to a certain track 50 (S101), the controller 30 increments the ATI counter of a track 50 or tracks 50 in the vicinity of the write destination track (S102). In S102, the controller 30 may increment the ATI counters of the tracks 50 adjacent to both sides in the radial direction of the write destination track 50, or may increment the ATI counters of all the tracks 50 within a predetermined range in the radial direction around the write destination track 50. The amount added in one increment may be fixed or may be different depending on the distance from the write destination track 50.

By S102, the operation of incrementing the ATI counter ends. Note that the controller 30 executes a series of operations illustrated in FIG. 6 every time data is written to the magnetic disk 11.

Figure 7:
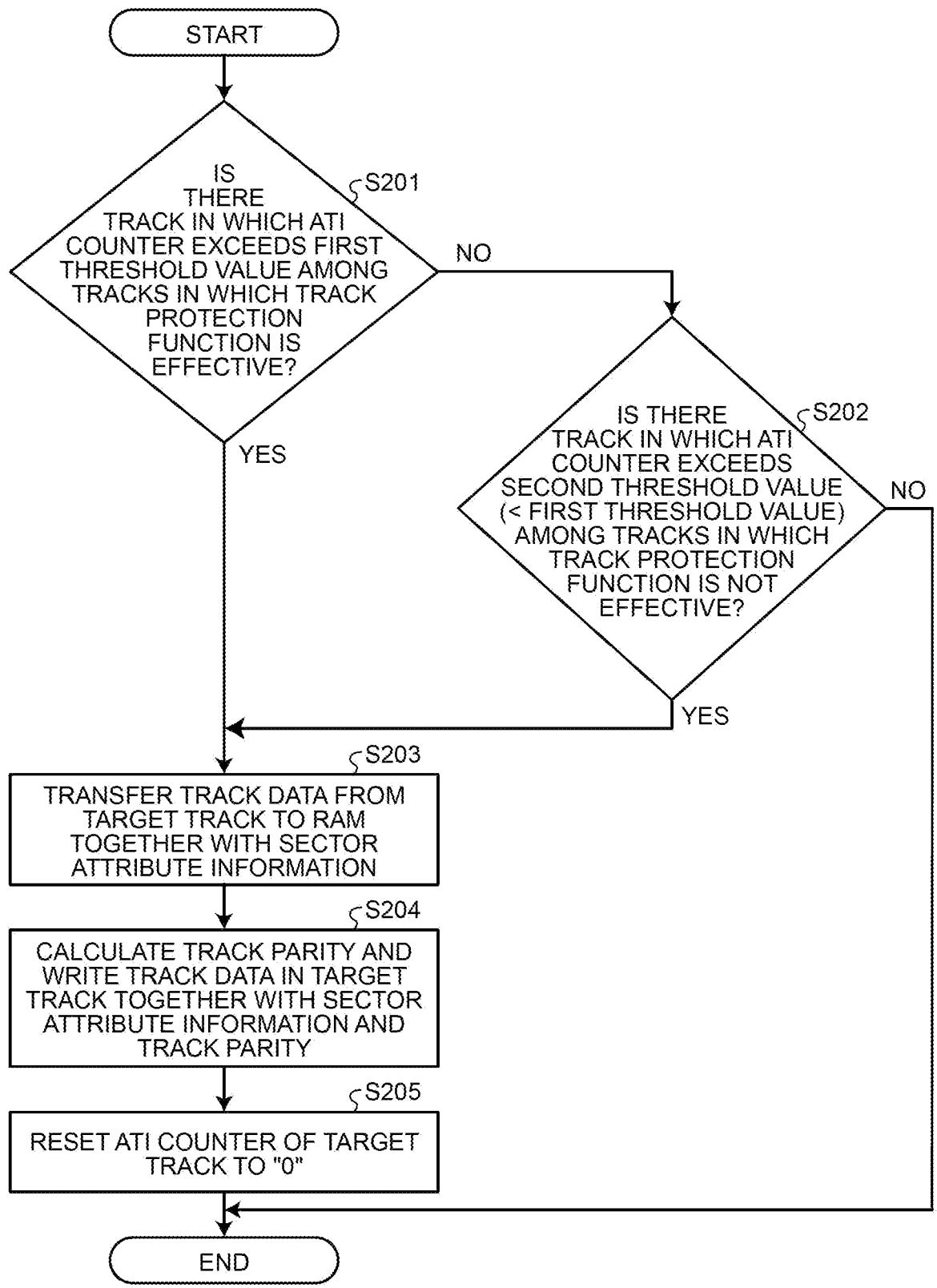
FIG. 7 is a flowchart illustrating an example of an operation of detecting a target track of a rewrite operation by the controller of the embodiment.

FIG. 7 is a flowchart illustrating an example of the operation of detecting the track 50 of the target of the rewrite operation by the controller 30 of the embodiment.

The controller 30 refers to the ATI information 271 and determines whether or not there is a track 50 in which the ATI counter exceeds the first threshold value among the tracks 50 in which the track protection function is effective (S201).

When it is determined as No in the determination processing of S201, the controller 30 determines whether or not there is a track 50 in which the ATI counter exceeds the second threshold value among the tracks 50 in which the track protection function is not effective (S202). However, as described above, the second threshold value is smaller than the first threshold value.

When it is determined as Yes in the determination processing of S201 or S202, the controller 30 determines the track 50 in which the ATI counter exceeds the threshold value, that is, the track 50 in which the ATI counter exceeds the first threshold value among the tracks 50 in which the track protection function is effective or the track 50 in which the ATI counter exceeds the second threshold value among the tracks 50 in which the track protection function is not effective, as the track 50 to be subjected to the rewrite operation, and executes the rewrite operation on the track 50. Note that in the description of FIG. 7, the track 50 determined as the target of the rewrite operation is referred to as a target track. Further, here, a case where one track 50 is determined as a target of the rewrite operation will be described. When two or more tracks 50 are determined as the target of the rewrite operation, the processing in and after S203 is executed for each track 50 determined as the target of the rewrite operation.

The controller 30 transfers the track data from the target track to the RAM 27 together with the sector attribute information 300 (S203). At this time, the controller 30 may execute various kinds of error correction including error correction in units of tracks as necessary.

After the processing of S203, the controller 30 writes the track data in the RAM 27 to the target track (S204). In S204, the controller 30 calculates the track parity and writes the track data in the target track 50 together with the sector attribute information 300 and the track parity.

After the processing of S204, the controller 30 resets the ATI counter of the target track to "0" (S205).

When it is determined as No in the determination processing of S201 and S202, or after the processing of S205, the controller 30 ends the operation of detecting the track 50 of the target of the rewrite operation.

Note that, in S201, it is determined whether or not there is a track 50 in which the ATI counter exceeds the first threshold value. It may be determined whether there is a track 50 in which the ATI counter is equal to or more than the first threshold value.

Further, in S202, it is determined whether or not there is a track 50 in which the ATI counter exceeds the second threshold value. It may be determined whether there is a track 50 in which the ATI counter is equal to or more than the second threshold value.

A series of operations illustrated in FIG. 7 can be executed at any timing. For example, the controller 30 may repeat the operation of the above example at a predetermined cycle. Alternatively, when the ATI counter is incremented by the operation illustrated in FIG. 6, the controller 30 may execute the operation illustrated in FIG. 7 using one or more tracks in which the ATI counter has been incremented as the detection target.

Figure 8:
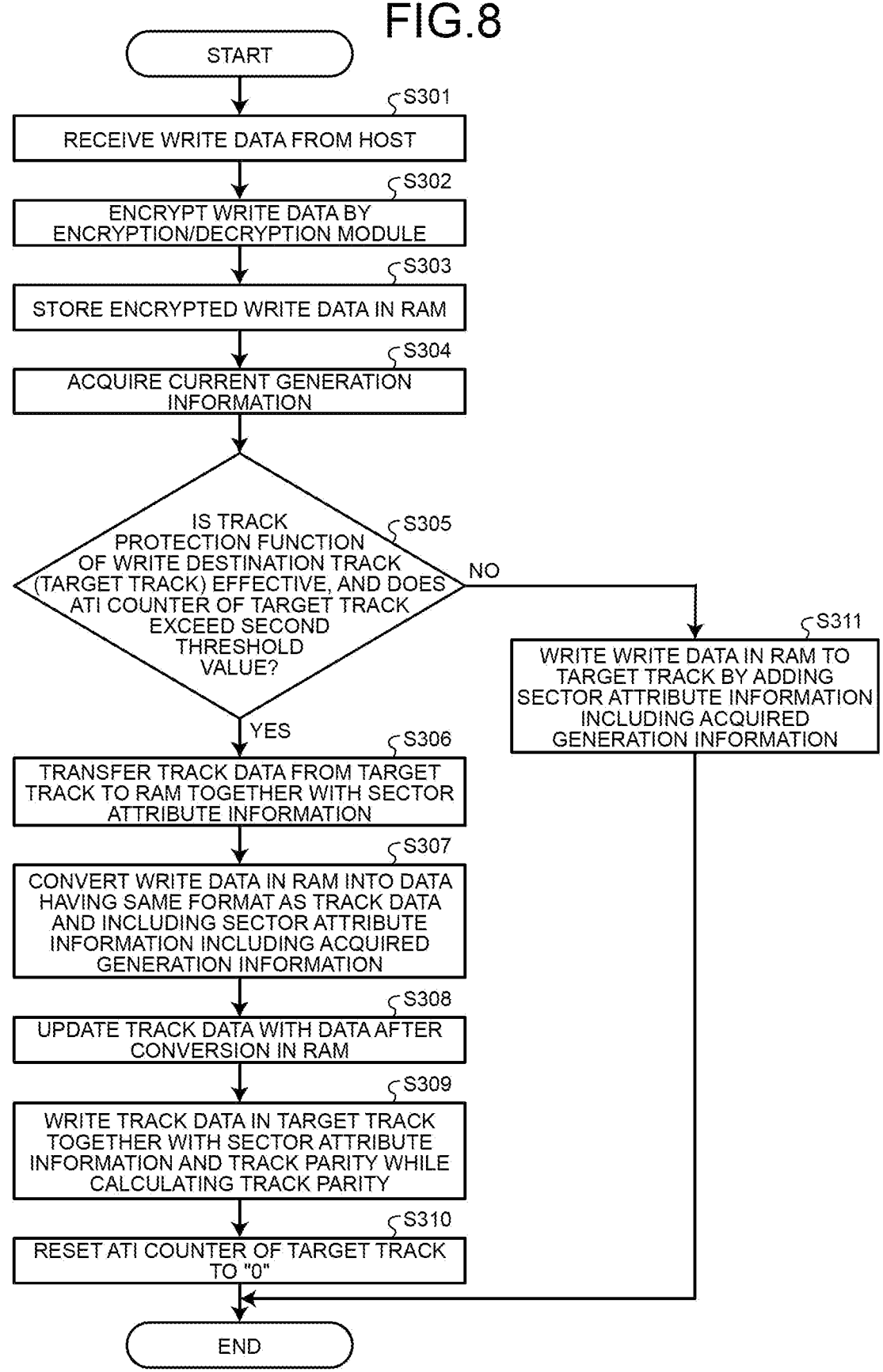
FIG. 8 is a flowchart illustrating an example of write operation in the magnetic disk device of the embodiment.

FIG. 8 is a flowchart illustrating an example of write operation in the magnetic disk device 1 of the embodiment.

When receiving the write data from the host 2 (S301), the controller 30 encrypts the write data by the encryption/ decryption module 29 (S302). The encryption/decryption module 29 executes encryption using a key corresponding to the LBA of the write data.

The controller 30 stores the encrypted write data in the RAM 27 (S303).

The controller 30 acquires the current generation information, that is, the generation information of the key used by the process of S302, from the encryption/decryption module 29 (S304).

Subsequently, the controller 30 determines whether or not the track protection function of the write destination track 50 is effective and the ATI counter of the write destination track 50 exceeds the second threshold value (S305). In the description of FIG. 8, the write destination track 50 is referred to as a target track.

Note that, in S305, the controller 30 may determine whether or not the track protection function of the write destination track 50 is effective and the ATI counter of the write destination track 50 is equal to or more than the second threshold value.

When it is determined as Yes in the determination processing of S305, the controller 30 transfers the track data from the target track to the RAM 27 together with the sector attribute information 300 (S306). The controller 30 reads the track data from the target track together with the sector attribute information 300, and stores the read track data in the RAM 27. At this time, the controller 30 may execute various kinds of error correction including error correction in units of tracks as necessary.

After the process of S306, the controller 30 converts the write data in the RAM 27 into data having the same format as the track data and including the sector attribute information 300 including the generation information acquired by the process of S304 (S307). Then, the controller 30 updates the track data with the data after conversion in the RAM 27 (S308).

The controller 30 writes the track data after update to the target track (S309). In the processing of S309, the controller 30 calculates the track parity and writes the track data to the target track 50 together with the sector attribute information and the track parity.

After the processing of S309, the controller 30 resets the AIT counter of the target track to "0" (S310).

When it is determined as No in the determination processing of S305, the controller 30 writes the write data of the RAM 27 to the target track by adding data including the sector attribute information 300 including the generation information acquired in the processing of S304 (S311).

After the processing of S301 or S311, the write operation ends.

Figure 9:
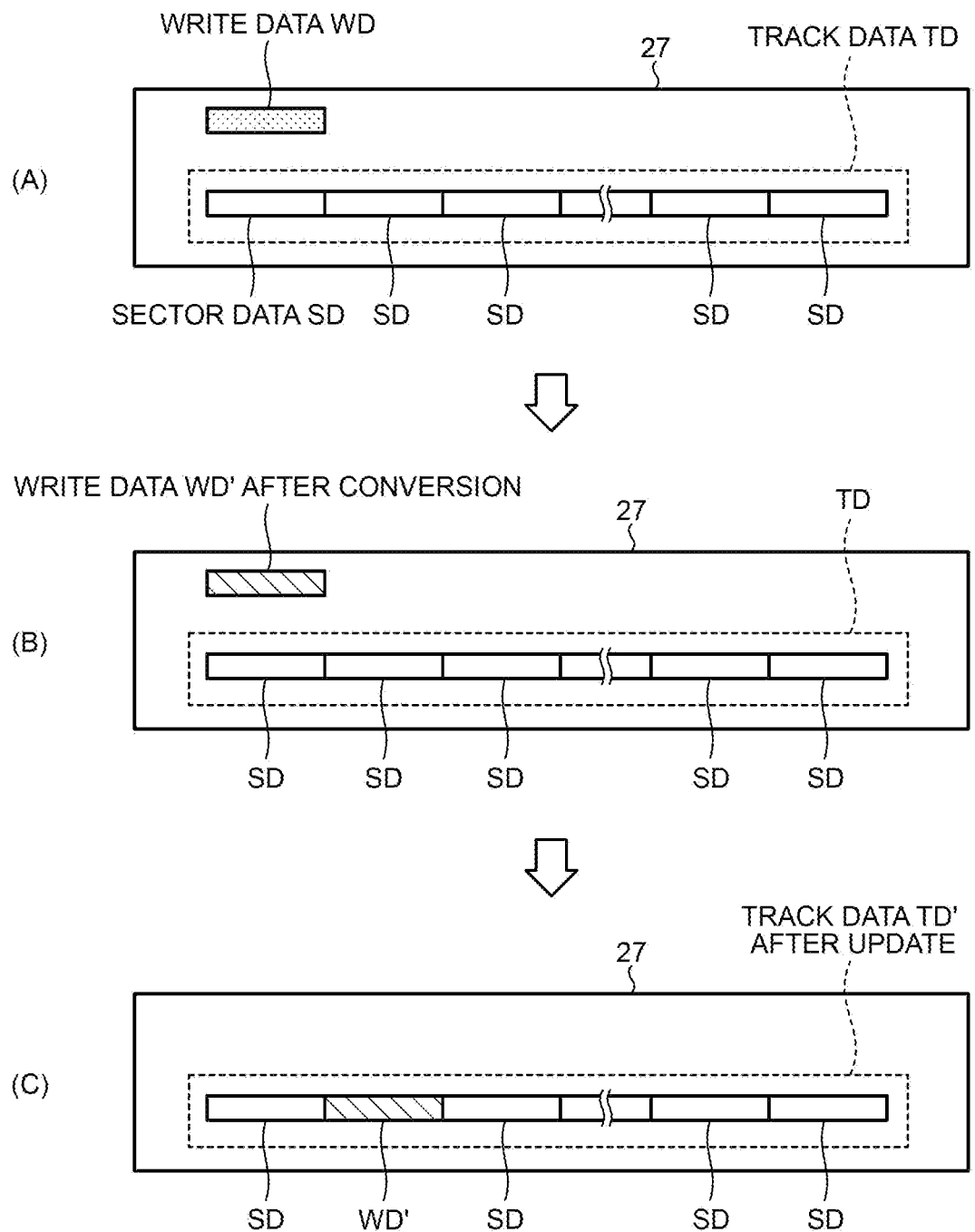
FIG. 9 is a diagram for describing processing of S307 and S308 in the magnetic disk device of the embodiment conforming to 4K native.

FIG. 9 is a diagram for describing the processing of S307 and S308 illustrated in FIG. 8. Here, a case where the magnetic disk device 1 conforms to a system called 4K native will be described. 4K native is a scheme in which both the host and the magnetic disk device handle data with a data segment of 4K bytes as a sector size. That is, the host 2 can instruct to write data in units of 4K bytes, and the controller 30 can write a data segment of 4K bytes per data sector.

A part A of FIG. 9 illustrates an example of the configurations of the write data and the track data in the RAM 27 at the time of the processing of S306. In the example of the drawing, a set of write data for one sector (referred to as write data WD here) and data segments (referred to as sector data SD here) read from all data sectors of the target track (referred to as track data TD here) is stored in the RAM 27. The write data WD does not include the sector attribute information 300.

A part B of FIG. 9 illustrates an example of the configurations of the write data and the track data in the RAM 27 at a time point immediately after the processing of S307. As illustrated in the drawing, the write data WD is converted into write data WD' in a format including the sector attribute information 300 by the processing of S307.

A part C of FIG. 9 illustrates an example of a configuration of track data in the RAM 27 at a time point immediately after the processing of S308. In the update process, the sector data SD read from a write destination sector of the write data WD in the track data TD is replaced with the write data WD' after conversion. Here, as an example, the sector data SD from the head to the second of the track data TD corresponds to the sector data SD read from the write destination sector of the write data WD, and the sector data SD is replaced with the write data WD' after conversion. The track data TD' after update is written to the target track by the processing of S309.

Figure 10:
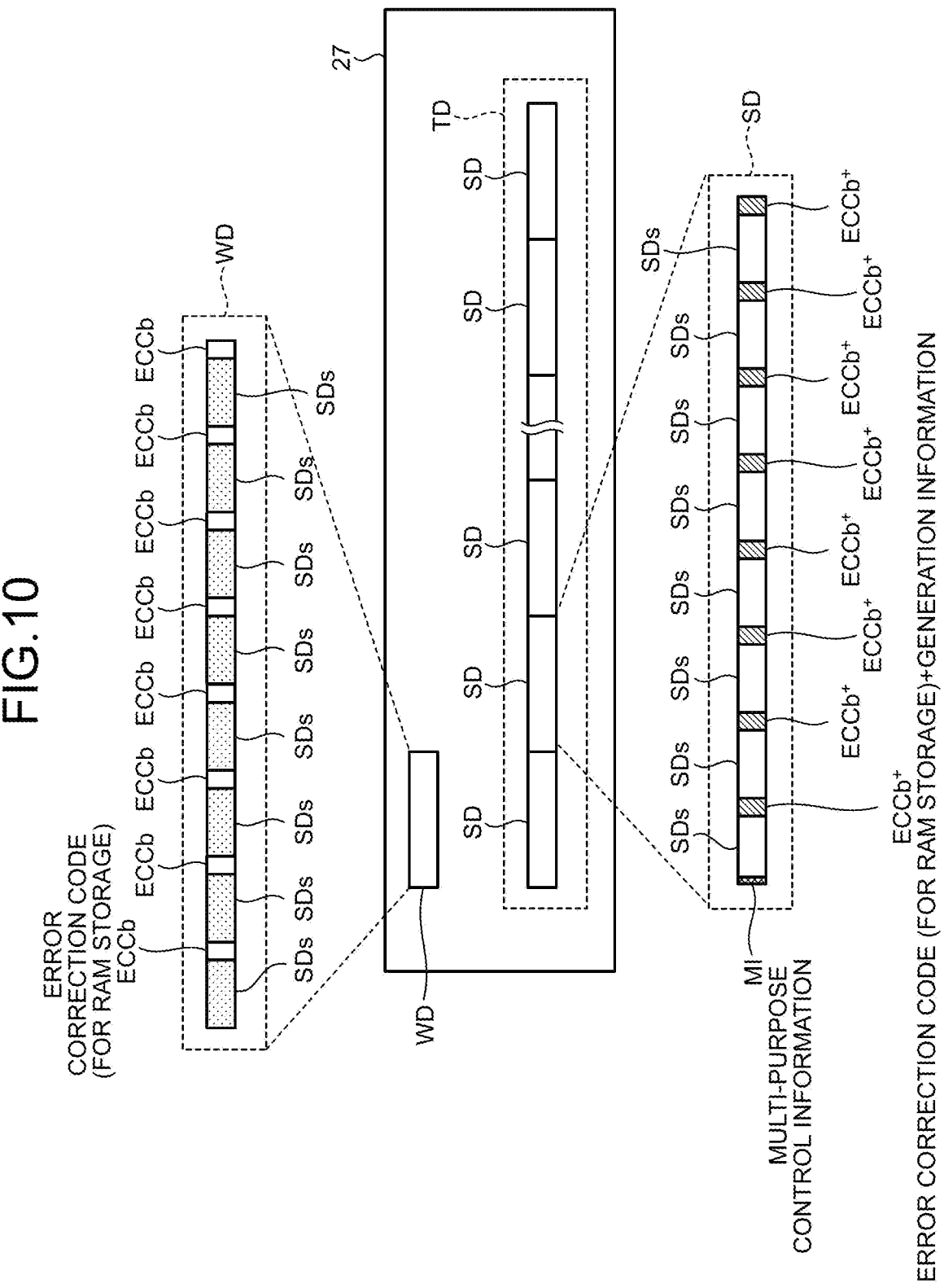
FIG. 10 is a diagram for describing a detailed example of a configuration of each piece of data illustrated in a part A of FIG. 9.

FIG. 10 is a diagram for describing a detailed example of to configuration of each piece of data illustrated in a part A of FIG. 9.

When storing data in the RAM 27, the controller divides the data into subsector sizes, and adds the error correction code for storing the RAM 27 to each data of the subsector size. The subsector size is, for example, 512 bytes.

In the example illustrated in FIG. 10, the write data WD in the RAM 27 includes eight pieces of 512 byte subsector data SDs, and has a configuration in which an error correction code ECCb for RAM storage is attached to the end of the subsector data SDs.

In the magnetic disk 11, multi-purpose control information MI, eight pieces of 512 byte subsector data SDs, and the generation information of respective pieces of subsector data SDs are stored in each data sector. The controller 30 attaches the error correction code ECCb+ including the generation information to data read from each data sector for each piece of subsector data SDs and stores the data in the RAM 27. Thus, as illustrated in FIG. 10, each sector data SD constituting the track data TD includes the multi-purpose control information MI among the sector attribute information 300 and the eight pieces of 512 byte subsector data SDs, and the error correction code ECCb+ for storage in the RAM 27 including the generation information in the sector attribute information 300 is attached to the end of each subsector data SDs.

Figure 11:
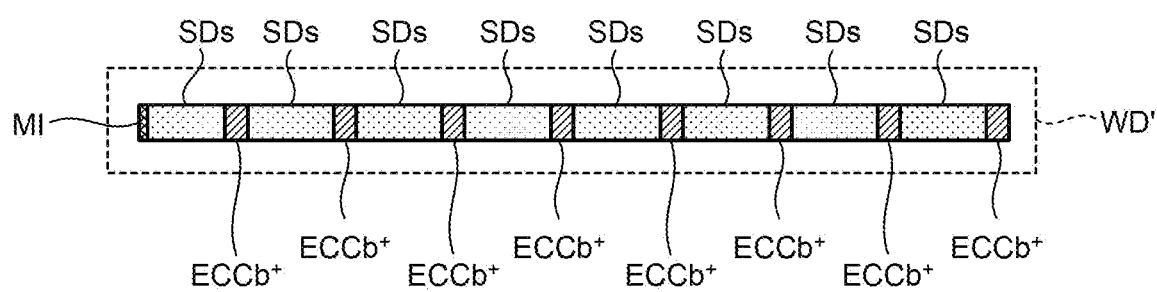
FIG. 11 is a diagram for describing a detailed example of a configuration of write data after conversion.

FIG. 11 is a diagram for describing a detailed example of a configuration of the write data WD' after conversion.

In the processing of S307, the controller 30 acquires the multi-purpose control information MI from the sector data SD read from the write destination sector of the write data among the sector data SD included in the track data TD, and adds the acquired multi-purpose control information MI to the head of the write data WD. Further, the controller 30 converts the error correction code ECCb of each piece of the subsector data SDs constituting the write data WD into the error correction code ECCb+ including the generation information acquired by the processing of S304. As a result, as illustrated in FIG. 11, the write data WD' after conversion having a format including the multi-purpose control information MI and the generation information similar to the sector data SD constituting the track data TD is obtained.

Note that when the track data TD' after update is read from the RAM 27, the error correction code ECCb+ attached to each subsector data SDs is deleted, and the generation information is attached to each subsector data SDs. Then, the track data TD' after update is written to the target track as a group of sector data SD including the multi-purpose control information MI and the eight pieces of 512 byte subsector data SDs to each of which the generation information is attached.

As described above, according to the embodiment, when data is stored in a data sector of a certain track 50 (referred to as a target track) together with the sector attribute information 300 and a parity is stored in the parity sector, in a case where random write for the target track, that is, write for the data sector of the target track is requested from the host 2, the controller 30 operates as follows. That is, the controller 30 acquires write data from the host 2 and stores the write data in the RAM 27 (see, for example, S301 to S303 in FIG. 8). The controller 30 reads the track data from the target track, that is, the data set including data and attribute information stored in all data sectors, and stores the track data in the RAM 27 (see, for example, S306 in FIG. 8). Then, the controller 30 acquires the sector attribute information 300 corresponding to the write destination sector of the write data, and updates the track data in the RAM 27 with the acquired sector attribute information 300 and the write data (see, for example, S304, S307, and S308 in FIGS. 8 and FIGS. 9 to 11). Then, the controller 30 calculates the track parity while writing the track data after update to the target track, and writes the track parity to the parity sector of the target track (S309).

That is, when starting the rewrite operation and writing the track data to the magnetic disk 11 in the rewrite operation, the controller 30 simultaneously writes data requested to be written. Therefore, since the number of times of write to the target track is suppressed, the time required for the processing of the write command is suppressed. That is, the write performance is improved.

Further, when the processing of the write command is completed, the target track is in a state where the track protection function is effective. Thus, unlike the comparative example, processing of recalculation and overwrite of the track parity after the processing of the write command can be omitted.

Further, according to the embodiment, in one example, the sector attribute information 300 is the generation information of the key used when encrypted by the encryption/decryption module 29 when data is acquired from the host 2.

Further, according to the embodiment, in another example, the sector attribute information 300 is information related to an error related to a sector in which the sector attribute information is stored (specifically, the first and second uncorrectable information).

The configuration of the sector attribute information 300 is not limited to these examples. The sector attribute information 300 may include other information instead of or in addition to the generation information and the error-related information.

Further, according to the embodiment, in a case where write is requested for the track 50 in which the track protection function is effective and the ATI counter exceeds the second threshold value, the controller 30 starts the rewrite operation, and writes the data requested to be written at the same time when the track data is written to the magnetic disk 11 in the rewrite operation (for example, see S306 to S310 in FIG. 8). In a case other than the above, that is, for example, in a case where write is requested for the track 50 in which the track protection function is effective and the ATI counter is less than the second threshold value, or in a case where write is requested for the track 50 in which the track protection function is not effective, the controller 30 does not start the rewrite operation, and writes the write data to the track 50 by adding the sector attribute information 300.

Therefore, it is possible to prevent the track protection function from becoming not to be effective in a state where the track protection function is effective and the ATI counter exceeds the second threshold value by writing the write data to the track 50 in which the ATI counter exceeds the second threshold value.

Note that, according to the above description, in a case where the write is requested for the track 50 in which the track protection function is effective and the ATI counter exceeds the second threshold value, the controller 30 starts the rewrite operation, and writes the data requested to be written at the same time when the track data is written to the magnetic disk 11 in the rewrite operation. Regardless of whether or not the track protection function of the write destination track 50 is effective, the controller 30 may start the rewrite operation and simultaneously write the data requested to be written when writing the track data to the magnetic disk 11 in the rewrite operation. In addition, the controller 30 may start the rewrite operation regardless of the ATI of the write destination track 50, and simultaneously write the data requested to be written when writing the track data to the magnetic disk 11 in the rewrite operation. The controller 30 may start the write operation when an arbitrary condition is satisfied, and may simultaneously write the data requested to be written when writing the track data to the magnetic disk 11 in the rewrite operation.

The details of the processing of S307 and S308 illustrated in FIG. 8 have been described above with reference to the case where the magnetic disk device 1 conforms to 4K native. The magnetic disk device to which the embodiment can be applied is not limited to a magnetic disk device conforming to 4K native. For example, the embodiment is also applicable to a magnetic disk device conforming to a system called 512 byte emulation.

According to the 512 byte emulation, the host transfers data to the magnetic disk device in units of 512 bytes. In the magnetic disk device, the controller collects data transferred to and from the host in units of 512 bytes and generates data of 4K bytes in total, and transfers the data to and from the magnetic disk in units of 4K bytes. That is, the host accesses the magnetic disk device with 512 bytes as a sector size, and the controller processes data with 4K bytes as a sector size.

Figure 12:
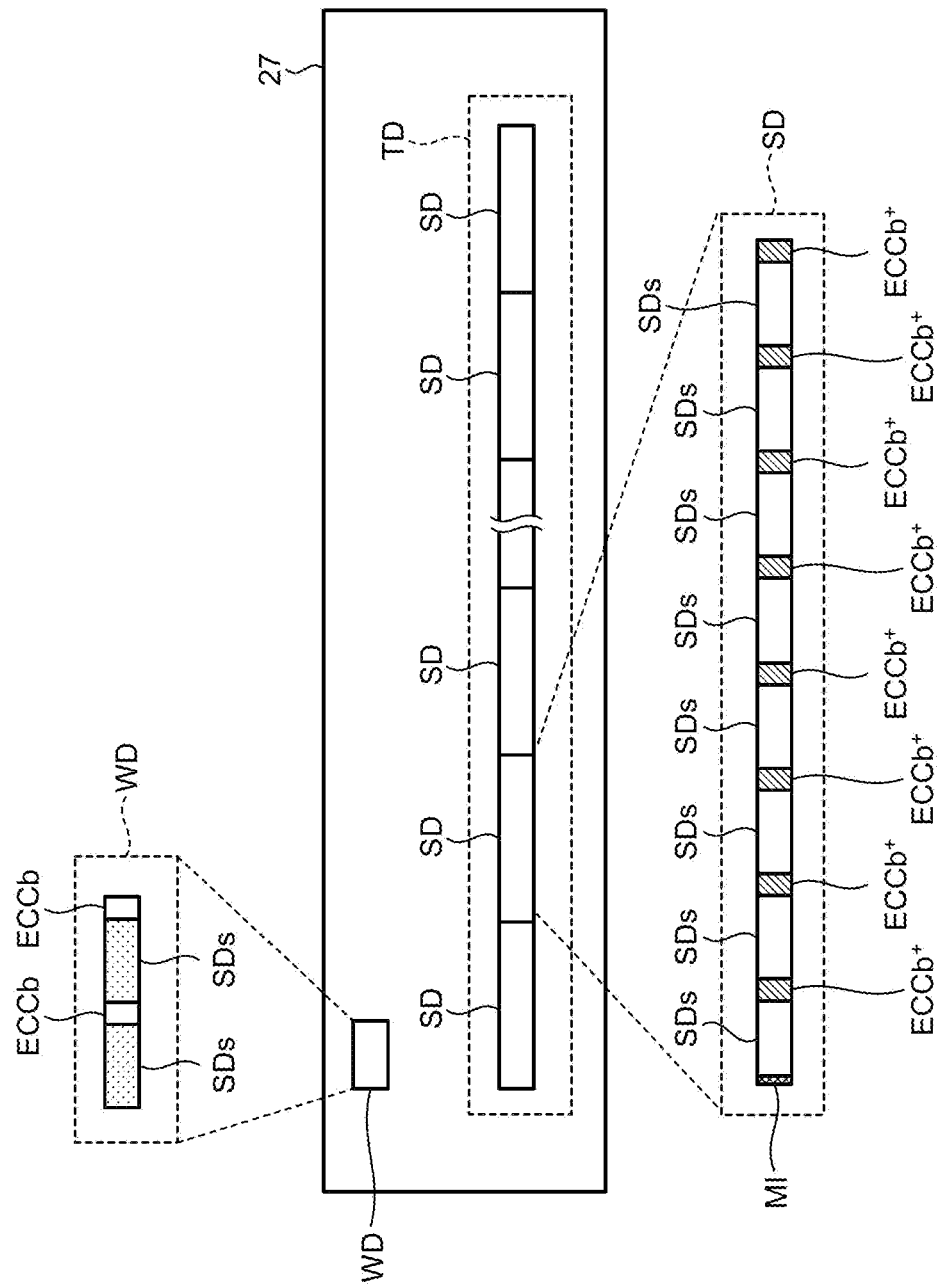
FIG. 12 is a diagram for describing a detailed example of a configuration of write data and track data in a RAM at a time of processing of S306 in the magnetic disk device of the embodiment conforming to 512 byte emulation.

FIG. 12 is a diagram for describing a detailed example of a configuration of write data and track data in the RAM 27 at the time of the processing of S306 in the magnetic disk device 1 of the embodiment conforming to 512 byte emulation. Here, for convenience, data in units of 512 bytes transferred by the host 2 is referred to as subsector data SDs.

In the example illustrated in FIG. 12, the controller 30 receives two pieces of subsector data SDs from the host 2. When storing the two subsector data SDs received from the host 2 in the RAM 27, the controller 30 adds the error correction code ECCb for RAM storage to each subsector data SDs. Therefore, the write data WD in the RAM 27 has a configuration including two pieces of subsector data SDs each attached with the error correction code ECCb.

The track data TD in the RAM 27 has the same configuration as the track data TD conforming to the 4K native method illustrated in FIG. 10.

Figure 13:
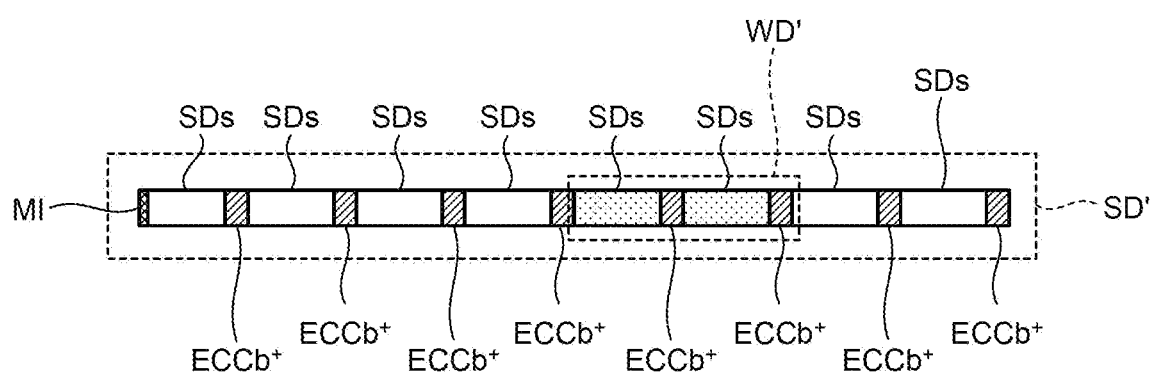
FIG. 13 is a diagram for describing a detailed example of a configuration of sector data updated using write data after conversion by processing of S308 in the magnetic disk device of the embodiment conforming to 512 byte emulation.

FIG. 13 is a diagram for describing a detailed example of a configuration of sector data SD' updated using the write data WD' after conversion by the processing of S308 in the magnetic disk device 1 of the embodiment conforming to 512 byte emulation.

In the processing of S307, the controller 30 converts the error correction code ECCb of each of the subsector data SDs constituting the write data WD into the error correction code ECCb+ including the generation information acquired by the process of S304. Consequently, the write data WD' after conversion is generated.

In the processing of S308, the controller 30 replaces a part designated as the write destination in the sector data SD read from the write destination sector included in the track data TD with the write data WD' after conversion. In the example illustrated in FIG. 13, data of subsectors at fifth and sixth positions from the head of the sector data SD is replaced with the write data WD' after conversion. The controller 30 further converts the error correction code ECCb+ including the generation information added to the remaining subsector data SDs that are not replaced in the sector data SD into the error correction code ECCb+ including the generation information acquired by the process of S304. Consequently, the updated sector data SD' is completed.

As described above, in the magnetic disk device 1 conforming to the 512 byte emulation, the controller 30 replaces a part of the sector data SD read from the write destination sector included in the track data TD with the write data, and replaces the generation information of the sector data SD with the generation information acquired by the processing of S304.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device connectable to a host, the magnetic disk device comprising:
   a magnetic disk provided with a first track including a plurality of first sectors (#1-9) and a second sector (#10);
   a magnetic head that writes and reads data to and from the magnetic disk;
   a memory; and
   a controller that,
      when a first data segment is stored with a first information piece (300) in each of the plurality of first sectors, the first information piece being attribute information of a first sector storing thereof out of the plurality of first sectors, a first parity is stored in the second sector, and write of a second data segment to a third sector that is one of the plurality of first sectors is requested from the host,
      acquires the second data segment from the host and stores the second data segment in the memory,
      reads a first data set that includes all first data segments and all first information pieces from the first track and stores the first data set in the memory,
      acquires a second information piece that is attribute information of the third sector,
      updates, in the memory, a third data segment and a third information piece that are a first data segment and a first information piece read from the third sector out of the first data set with the second data segment and the second information piece,
      calculates a second parity on a basis of a second data set that is the first data set after update while writing the second data set to the first track, and writes the second parity in the second sector.

2. The magnetic disk device according to claim 1, further comprising
   an encryption/decryption module that performs encryption for a data segment acquired from the host by using a key and performs decryption for a data segment to be transmitted to the host by using the key, wherein
   the third information piece includes generation information of the key used for encryption for the third data segment when the third data segment is acquired from the host, and
   the second information piece includes generation information of the key used for encryption for the second data segment when the second data segment is acquired from the host.

3. The magnetic disk device according to claim 1, wherein attribute information includes information related to an error related to a first sector in which the attribute information is stored among the plurality of first sectors.

4. The magnetic disk device according to claim 1, wherein
   the magnetic disk is provided with a plurality of second tracks including the first track,
   each of the plurality of second tracks includes a plurality of fourth sectors to each of which a data segment is stored with attribute information and a fifth sector to which a parity is written, and
   the controller
   estimates a degree of influence of adjacent track interference (ATI) which each of the second tracks receives,
   executes, in a case where a degree of influence of ATI which a second track in a first state out of the plurality of second tracks receives exceeds a first threshold value, rewrite of contents of the second track including recalculation of a parity and write of the recalculated parity, the first state being a state in which contents of the plurality of fourth sectors and a parity in the fifth sector out of the second track correspond to each other,
   executes, in a case where a degree of influence of ATI which a second track in a second state out of the plurality of second tracks receives exceeds a second threshold value smaller than the first threshold value, rewrite of contents of the second track including recalculation of a parity and write of the recalculated parity, the second state being a state in which contents of the plurality of fourth sectors and a parity in the fifth sector out of the second track do not correspond to each other, and
   in a case where the first track is in the first state and a degree of influence of ATI which the first track receives exceeds the second threshold value,
      acquires the second data segment from the host and stores the second data segment in the memory,
      reads the first data set from the first track and stores the first data set in the memory,
      acquires the second information piece,
      updates the third data segment and the third information piece out of the first data set in the memory with the second data segment and the second information piece, calculates the second parity on a basis of the second data set while writing the second data set to the first track, writes the second parity in the second sector, and in a case where the first track is in the first state and a degree of influence of ATI which the first track receives is less than the second threshold value, or in a case where the first track is in the second state, acquires the second data segment from the host, acquires the second information piece, and writes the second data segment in the third sector with the second information piece.

5. The magnetic disk device according to claim 2, wherein the magnetic disk is provided with a plurality of second tracks including the first track, each of the plurality of second tracks includes a plurality of fourth sectors to each of which a data segment is stored with attribute information and a fifth sector to which a parity is written, and the controller estimates a degree of influence of adjacent track interference (ATI) which each of the second tracks receives, executes, in a case where a degree of influence of ATI which a second track in a first state out of the plurality of second tracks receives exceeds a first threshold value, rewrite of contents of the second track including recalculation of a parity and write of the recalculated parity, the first state being a state in which contents of the plurality of fourth sectors are correspond to a parity in the fifth sector out of the second track, executes, in a case where a degree of influence of ATI which a second track in a second state out of the plurality of second tracks receives exceeds a second threshold value smaller than the first threshold value, rewrite of contents of the second track including recalculation of a parity and write of the recalculated parity, the second state being a state in which contents of the plurality of fourth sectors do not correspond to a parity in the fifth sector out of the second track, and in a case where the first track is in the first state and a degree of influence of ATI which the first track receives exceeds the second threshold value, acquires the second data segment from the host and stores the second data segment in the memory, reads the first data set from the first track and stores the first data set in the memory, acquires the second information piece, updates the third data segment and the third information piece out of the first data set in the memory with the second data segment and the second information piece, calculates the second parity on a basis of the second data set while writing the second data set to the first track, writes the second parity in the second sector, and in a case where the first track is in the first state and a degree of influence of ATI which the first track receives is less than the second threshold value, or in a case where the first track is in the second state, acquires the second data segment from the host, acquires the second information piece, and writes the second data segment in the third sector with the second information piece.

6. The magnetic disk device according to claim 3, wherein the magnetic disk is provided with a plurality of second tracks including the first track, each of the plurality of second tracks includes a plurality of fourth sectors to each of which a data segment is stored with attribute information and a fifth sector to which a parity is written, and the controller estimates a degree of influence of adjacent track interference (ATI) which each of the second tracks receives, executes, in a case where a degree of influence of ATI which a second track in a first state out of the plurality of second tracks receives exceeds a first threshold value, rewrite of contents of the second track including recalculation of a parity and write of the recalculated parity, the first state being a state in which contents of the plurality of fourth sectors are correspond to a parity in the fifth sector out of the second track, executes, in a case where a degree of influence of ATI which a second track in a second state out of the plurality of second tracks receives exceeds a second threshold value smaller than the first threshold value, rewrite of contents of the second track including recalculation of a parity and write of the recalculated parity, the second state being a state in which contents of the plurality of fourth sectors do not correspond to a parity in the fifth sector out of the second track, and in a case where the first track is in the first state and a degree of influence of ATI which the first track receives exceeds the second threshold value, acquires the second data segment from the host and stores the second data segment in the memory, reads the first data set from the first track and stores the first data set in the memory, acquires the second information piece, updates the third data segment and the third information piece out of the first data set in the memory with the second data segment and the second information piece, calculates the second parity on a basis of the second data set while writing the second data set to the first track, writes the second parity in the second sector, and in a case where the first track is in the first state and a degree of influence of ATI which the first track receives is less than the second threshold value, or in a case where the first track is in the second state, acquires the second data segment from the host, acquires the second information piece, and writes the second data segment in the third sector with the second information piece.

7. The magnetic disk device according to claim 4, wherein in a case where the second data segment is smaller than the third data segment, a part of the third data segment is replaced with the second data segment, and the third attribute information is replaced with the second attribute information.

8. The magnetic disk device according to claim 5, wherein in a case where the second data segment is smaller than the third data segment, a part of the third data segment is replaced with the second data segment, and the third attribute information is replaced with the second attribute information.

9. The magnetic disk device according to claim 6, wherein in a case where the second data segment is smaller than the third data segment, a part of the third data segment is replaced with the second data segment, and the third attribute information is replaced with the second attribute information.

10. A method of controlling a magnetic disk device including a magnetic disk, a magnetic head that writes and reads data to and from the magnetic disk, and a memory, the method comprising:
storing a first data segment with first information piece in each of a plurality of first sectors, the first information piece being attribute information of a first sector storing thereof out of the plurality of first sectors, the magnetic disk being provided with a first track, the firs track including the plurality of first sectors and a second sector;
storing a first parity in the second sector; and
in a case where write of a second data segment to a third sector that is one of the plurality of first sectors is requested from a host,
acquiring the second data segment from the host and storing the second data segment in the memory,
reading a first data set that includes all first data segments and all first information pieces from the first track and stores the first data set in the memory,
acquiring a second information piece that is attribute information of the third sector,
updating, in the memory, a third data segment and a third information piece that are a first data segment and a first information piece read from the third sector out of the first data set with the second data segment and the second information piece,
calculating a second parity on a basis of a second data set that is the first data set after update while writing the second data set to the first track, and
writing the second parity in the second sector.

11. The method according to claim 10, further comprising performing encryption for a data segment acquired from the host by using a key and performing decryption for a data segment to be transmitted to the host by using the key, wherein
the third information piece includes generation information of the key used for encryption for the third data segment when the third data segment is acquired from the host, and
the second information piece includes generation information of the key used for encryption for the second data segment when the second data segment is acquired from the host.

12. The method according to claim 10, wherein
attribute information includes information related to an error related to a first sector in which the attribute information is stored among the plurality of first sectors.

13. The method according to claim 10, wherein
the magnetic disk is provided with a plurality of second tracks including the first track,
each of the plurality of second tracks includes a plurality of fourth sectors to each of which a data segment is written with attribute information and a fifth sector to which a parity is written, and
the method further comprises
estimating a degree of influence of ATI which each of second tracks receives,
executing, in a case where a degree of influence of ATI which a second track in a first state out of the plurality of second tracks receives exceeds a first threshold value, rewrite of contents of the second track including recalculation of a parity and write of the recalculated parity, the first state being a state in which contents of the plurality of fourth sectors and a parity in the fifth sector out of the second track correspond to each other, and
executing, in a case where a degree of influence of ATI which a second track in a second state out of the plurality of second tracks receives exceeds a second threshold value smaller than the first threshold value, rewrite of contents of the second track including recalculation of a parity and write of the recalculated parity, the second state being a state in which contents of the plurality of fourth sectors and a parity in the fifth sector out of the second track do not correspond to each other, and
in a case where the first track is in the first state and a degree of influence of ATI which the first track received exceeds the second threshold value,
acquiring the second data segment from the host and storing the second data segment in the memory,
reading the first data set from the first track and storing the first data set in the memory,
acquiring the second information piece,
updating the third data segment and the third information piece out of the first data set in the memory with the second data segment and the second information piece,
calculating the second parity on a basis of the second data set while writing the second data set to the first track, and
writing the second parity in the second sector, and
in a case where the first track is in the first state and a degree of influence of ATI which the first track received is less than the second threshold value, or in a case where the first track is in the second state,
acquiring the second data segment from the host,
acquiring the second information piece, and
writing the second data segment in the third sector with the second information piece.

14. The method according to claim 11, wherein
the magnetic disk is provided with a plurality of second tracks including the first track,
each of the plurality of second tracks includes a plurality of fourth sectors to each of which a data segment is written with attribute information and a fifth sector to which a parity is written, and
the method further comprises
estimating a degree of influence of ATI which each of second tracks receives,
executing, in a case where a degree of influence of ATI which a second track in a first state out of the plurality of second tracks receives exceeds a first threshold value, rewrite of contents of the second track including recalculation of a parity and write of the recalculated parity, the first state being a state in which contents of the plurality of fourth sectors and a parity in the fifth sector out of the second track correspond to each other, and
executing, in a case where a degree of influence of ATI which a second track in a second state out of the plurality of second tracks receives exceeds a second threshold value smaller than the first threshold value, rewrite of contents of the second track including recalculation of a parity and write of the recalculated parity, the second state being a state in which contents of the plurality of fourth sectors and a parity in the fifth sector out of the second track do not correspond to each other, and in a case where the first track is in the first state and a degree of influence of ATI which the first track received exceeds the second threshold value,
  acquiring the second data segment from the host and storing the second data segment in the memory,
  reading the first data set from the first track and storing the first data set in the memory,
  acquiring the second information piece,
  updating the third data segment and the third information piece out of the first data set in the memory with the second data segment and the second information piece,
  calculating the second parity on a basis of the second data set while writing the second data set to the first track, and
  writing the second parity in the second sector, and
in a case where the first track is in the first state and a degree of influence of ATI which the first track received is less than the second threshold value, or in a case where the first track is in the second state,
  acquiring the second data segment from the host,
  acquiring the second information piece, and
  writing the second data segment in the third sector with the second information piece.

15. The method according to claim 12, wherein
the magnetic disk is provided with a plurality of second tracks including the first track,
each of the plurality of second tracks includes a plurality of fourth sectors to each of which a data segment is written with attribute information and a fifth sector to which a parity is written, and
the method further comprises
estimating a degree of influence of ATI which each of second tracks receives,
executing, in a case where a degree of influence of ATI which a second track in a first state out of the plurality of second tracks receives exceeds a first threshold value, rewrite of contents of the second track including recalculation of a parity and write of the recalculated parity, the first state being a state in which contents of the plurality of fourth sectors and a parity in the fifth sector out of the second track correspond to each other, and
executing, in a case where a degree of influence of ATI which a second track in a second state out of the plurality of second tracks receives exceeds a second threshold value smaller than the first threshold value, rewrite of contents of the second track including recalculation of a parity and write of the recalculated parity, the second state being a state in which contents of the plurality of fourth sectors and a parity in the fifth sector out of the second track do not correspond to each other, and
in a case where the first track is in the first state and a degree of influence of ATI which the first track received exceeds the second threshold value,
  acquiring the second data segment from the host and storing the second data segment in the memory,
  reading the first data set from the first track and storing the first data set in the memory,
  acquiring the second information piece,
  updating the third data segment and the third information piece out of the first data set in the memory with the second data segment and the second information piece,
  calculating the second parity on a basis of the second data set while writing the second data set to the first track, and
  writing the second parity in the second sector, and
in a case where the first track is in the first state and a degree of influence of ATI which the first track received is less than the second threshold value, or in a case where the first track is in the second state,
  acquiring the second data segment from the host,
  acquiring the second information piece, and
  writing the second data segment in the third sector with the second information piece.

16. The method of claim 13 further comprising:
in a case where the second data segment is smaller than the third data segment, replacing a part of the third data segment with the second data segment, and replacing the third information piece with the second information piece.

17. The method of claim 14 further comprising:
in a case where the second data segment is smaller than the third data segment, replacing a part of the third data segment with the second data segment, and replacing the third information piece with the second information piece.

18. The method of claim 15 further comprising:
in a case where the second data segment is smaller than the third data segment, replacing a part of the third data segment with the second data segment, and replacing the third information piece with the second information piece.

* * * * *